United States Patent [19]

Fukuda et al.

[11] Patent Number: 5,084,129

[45] Date of Patent: Jan. 28, 1992

[54] METHOD OF PRODUCING COMPOSITE TYPE, METAL-IN-GAP MAGNETIC HEAD CORE

[75] Inventors: Naoya Fukuda, Aichi; Masahiro Masuda, Inuyama; Eigo Hirotsuzi, Kohnan; Nobuhiro Terada, Kasugai, all of Japan

[73] Assignee: NGK Insulators, Ltd., Japan

[21] Appl. No.: 592,343

[22] Filed: Oct. 3, 1990

[30] Foreign Application Priority Data

Oct. 3, 1989 [JP] Japan .................................. 1-258358

[51] Int. Cl.⁵ ........................... B44C 1/22; C23F 1/02
[52] U.S. Cl. ..................................... 156/634; 29/603; 156/645; 156/656; 156/659.1
[58] Field of Search .................... 204/129.65, 192.2; 29/603; 156/645, 650, 656, 659.1, 661.1, 664, 634; 360/103, 119, 121, 125, 126

[56] References Cited

U.S. PATENT DOCUMENTS

| | | | |
|---|---|---|---|
| 3,514,851 | 6/1970 | Perkins et al. | 29/603 |
| 4,078,300 | 3/1978 | Lazzari | 29/603 |
| 4,100,584 | 7/1978 | Behr et al. | 360/125 |
| 4,815,197 | 3/1989 | Ota et al. | 29/603 |
| 4,899,241 | 2/1990 | Miyakawa et al. | 360/125 |
| 5,013,394 | 5/1991 | Rolland et al. | 156/645 X |

*Primary Examiner*—William A. Powell
*Attorney, Agent, or Firm*—Parkhurst, Wendel & Rossi

[57] ABSTRACT

A method of producing a composite type magnetic head core, WHEREIN a first and a second ferrite block are joined together into an integral ferrite structure, such that a metallic magnetic film is interposed between opposite portions of joining surfaces of the two ferrite blocks which define a magnetic gap open in a track portion provided by the ferrite blocks, and said integral ferrite structure is cut to shape a yoke portion which includes at least a part of the track portion. Said metallic magnetic film, said track portion and said yoke portion having a first, a second and a third width as measured in a direction parallel to said magnetic gap, respectively, characterized in that: Before the two ferrite blocks are bonded together at the joining surfaces, the metallic magnetic film is formed on at least one of the opposite portions of the joining surfaces, such that the width of the film is no less than the width of the track portion, and is no more than the width of the yoke portion.

11 Claims, 8 Drawing Sheets

METHOD OF PRODUCING COMPOSITE TYPE, METAL-IN-GAP MAGNETIC HEAD CORE

BACKGROUND OF THE INVENTION

1. Field of the Invention

The present invention relates in general to a method of fabricating a composite type magnetic head core, and more particularly to a method advantageously used for fabricating such a composite magnetic head core suitable for use with a recording medium having a high coercive force.

2. Discussion of the Prior Art

In the art of information recording and reproduction, it is known that the density of recording of information per unit area of a magnetic recording medium may be increased with an increase in the coercive force (Hc) of the medium. However, the recording on such a magnetic recording medium having a high coercive force requires a relatively high strength of a magnetic field produced by a leakage flux of a magnetic head. A ferrite material used for a magnetic head core presently available has a saturation magnetic flux density (Bs) which ranges from 4000 G (gauss) to 5000 G, whereby the recording magnetic field strength is more or less limited. Therefore, the currently available magnetic head core is not sufficiently capable of effecting a high-density recording, where the coercive force of the magnetic recording medium exceeds 1000 Oe (oersted).

A recently proposed solution to the above problem is the use of a composite type, so-called "metal-in-gap" magnetic head core wherein a magnetic film with a suitable thickness consisting of a metallic magnetic material is interposed between opposite surfaces of a ferrite material which define a magnetic gap therebetween. Such a metallic magnetic material, which may be a crystalline alloy such as Fe-Al-Si alloy (Sendust) or Ni-Fe alloy (Permalloy), or a non-crystalline alloy, is applied to at least one of the opposite ferrite surfaces defining the magnetic gap, for improving the recording characteristic of the head core when used with a high coercive force medium.

Conventionally, the composite, metal-in-gap magnetic head core of the type described above is produced in the following manner. That is, a first and a second ferrite blocks are butted and joined together so as to form an annular magnetic path, and define a magnetic gap therebetween. More particularly, the joining surfaces of these first and second ferrite blocks are initially mirror-finished, and a magnetic layer or film consisting of a metallic magnetic material is applied to at least one of the joining surfaces. Then, the two ferrite blocks are joined together at the joining surfaces, with a suitable bonding material such as a glass, to prepare an integral ferrite structure having a magnetic gap in which the metallic magnetic material exists. The thus prepared ferrite structure is cut at appropriate positions, to produce a desired composite metal-in-gap magnetic head core (head core slider).

In the method described above, the first and second ferrite blocks are joined together at an elevated temperature, and internal thermal stresses occur in the ferrite material providing the core body and the metallic magnetic material applied to the magnetic gap defining surface of the ferrite, since these two materials have a relatively large difference in coefficient of thermal expansion (for example, $110$–$120 \times 10^3$ in the case of a ferrite, and $140$–$150 \times 10^7$ in the case of Sendust). In this condition, the ferrite structure is subsequently subjected to a cutting or machining operation to produce a suitably shaped head core. At this time, the metallic magnetic layer or film is cut with the ferrite material, and tends to be separated or removed from the ferrite surface to which the layer or film is bonded. Further, the machining operation may cause cracking of the ferrite portion adjacent to the metallic magnetic layer. These structural defects undesirably lead to a relatively low yield ratio of the magnetic head core, and reduced operating stability and reliability of the produced head core. Thus, the conventional method suffers from a potential problem that should be solved.

SUMMARY OF THE INVENTION

It is therefore an object of the present invention to provide a method of producing a composite magnetic head core having high operating stability and reliability, with an improved yield ratio, while avoiding separation or removal of a metallic magnetic film from a ferrite material of a prepared ferrite structure, and cracking of the ferrite material during machining of the ferrite structure to shape the head core slider.

The above object may be attained according to the principle of the present invention, which provides a method of producing a composite type magnetic head core, including a step of joining together a first and a second ferrite block into an integral ferrite structure such that a metallic magnetic film is interposed between opposite portions of joining surfaces of the first and second ferrite blocks which define a magnetic gap open in an annular magnetic path which is partially defined by a track portion provided by the first and second ferrite blocks, and a step of cutting the integral ferrite structure to shape a yoke portion which includes at least a part of the track portion, the metallic magnetic film, the track portion and the yoke portion having a first, a second and a third width as measured in a direction parallel to the magnetic gap, respectively, the method comprising the step of forming the metallic magnetic film on at least one of the opposite portions of the joining surfaces of the first and second ferrite blocks, before bonding of the first and second ferrite blocks at the joining surfaces, such that the first width is no less than the second width of the track portion, and is no more than the third width of the yoke portion.

In the present method of the invention described above, the width of the metallic magnetic film is equal to or smaller than the width of the yoke portion, namely, no more than the spacing between the two cutting planes in which the appropriate portion of the integral ferrite structure consisting of the bonded first and second ferrite blocks is cut to shape the yoke portion. Consequently, the metallic magnetic film is free from stresses upon cutting of the ferrite structure in the above two cutting planes, whereby the magnetic film is protected from otherwise possible separation or removal from the ferrite material, and cracking of the ferrite material adjacent to the magnetic film.

It will therefore be understood that the present method permits production of the composite type, metal-in-gap magnetic head core with a high yield ratio, while assuring excellent operating stability of the head core. Thus, the present invention is industrially significant for efficient production of the head core with improved reliability

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
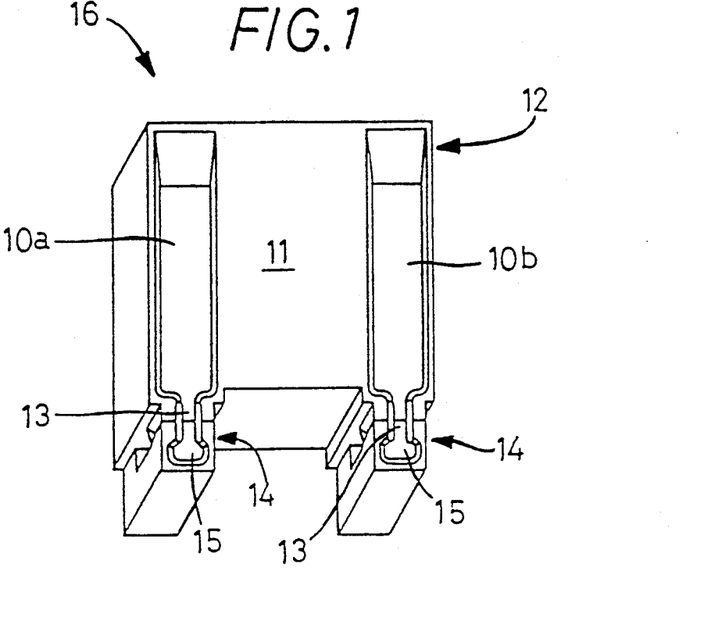
FIG. 1 is a perspective view showing an example of a magnetic head core slider for a rigid magnetic disk drive to which the method of the present invention is advantageously applicable.

The preferred embodiments of the method according to the principle of the present invention which will be described are applied to a floating-type or air-bearing type magnetic head core slider as shown in FIG. 1 used for a rigid magnetic disk drive (sometimes abbreviated as "RDD"). The magnetic head core slider is indicated generally at 16 in FIG. 1. The core slider 16 includes a slider body 12, and a pair of yoke portions 14 formed integrally with the slider body 12. Each yoke portion 14 is generally C-shaped in cross section and cooperates with the slider body 12 to form a closed magnetic path. The slider body 12 of the core slider 16 has a disk sliding surface 11 (air-bearing surface) which has a left and a right air-bearing portion or surface 10a, 10b, which extend in a sliding direction in which a recording medium slidably moves relative to the core slider. The two air-bearing portions 10a, 10b are spaced apart from each other in a direction perpendicular to the sliding direction. The core slider 16 also has track portions 13 which extend in the sliding direction from the respective air-bearing portions 10a, 10b on the slider body 12, over the respective yoke portions 14. Each track portion 13 has a smaller width than the air-bearing portion 10a, 10b, and a magnetic gap open at an almost middle part thereof. The core slider 16 further has protrusions 15 which are formed on the respective yoke portions 14, so as to extend from the respective track portions 13 in the sliding direction. Each protrusion 15 has a width which is larger than that of the track portions 13 and is smaller than that of the air-bearing portions 10a, 10b.

Figure 2:
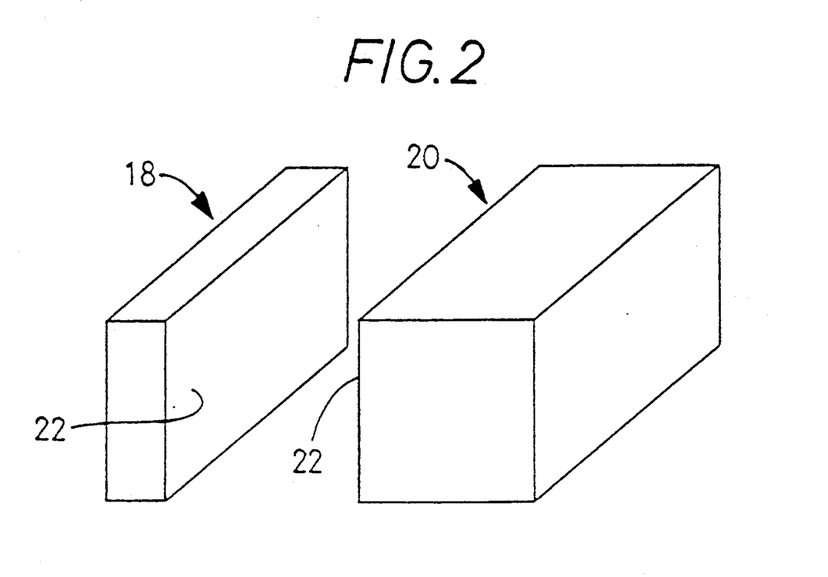
FIG. 2 is a perspective view of a first and a second ferrite block which are combined to produce a plurality of magnetic head core sliders as shown in FIG. 1.

For fabricating the magnetic head core slider 16 constructed as described above, according to one embodiment of the method of the invention, a first and a second ferrite blocks 18, 20 as shown in FIG. 2 are prepared. The first ferrite block 18 eventually gives the yoke portions 14, while the second ferrite block 20 eventually give the slider body 12. These ferrite blocks 18, 20 are formed of a known ferrite material having a high degree of magnetic permeability, as relatively elongate rectangular plates having suitable thicknesses. As described below, the blocks 18, 20 are butted and joined together so as to form a closed or annular magnetic path. Examples of the highly permeable ferrite materials include a single crystal and a polycrystalline structures of a Mn-Zn ferrite or a Ni-Zn ferrite, and a composite structure consisting of a single crystal portion and a polycrystalline portion. When single crystals are used for the ferrite blocks 18, 20, the crystal planes (100), (110), (311), (332), (611) and (211) are preferably selected for the disk sliding or air-bearing surface 11.

Before the first and second ferrite blocks 18, 20 are butted together at joining surfaces 22, these surfaces are mirror-finished by grinding.

Figure 3:
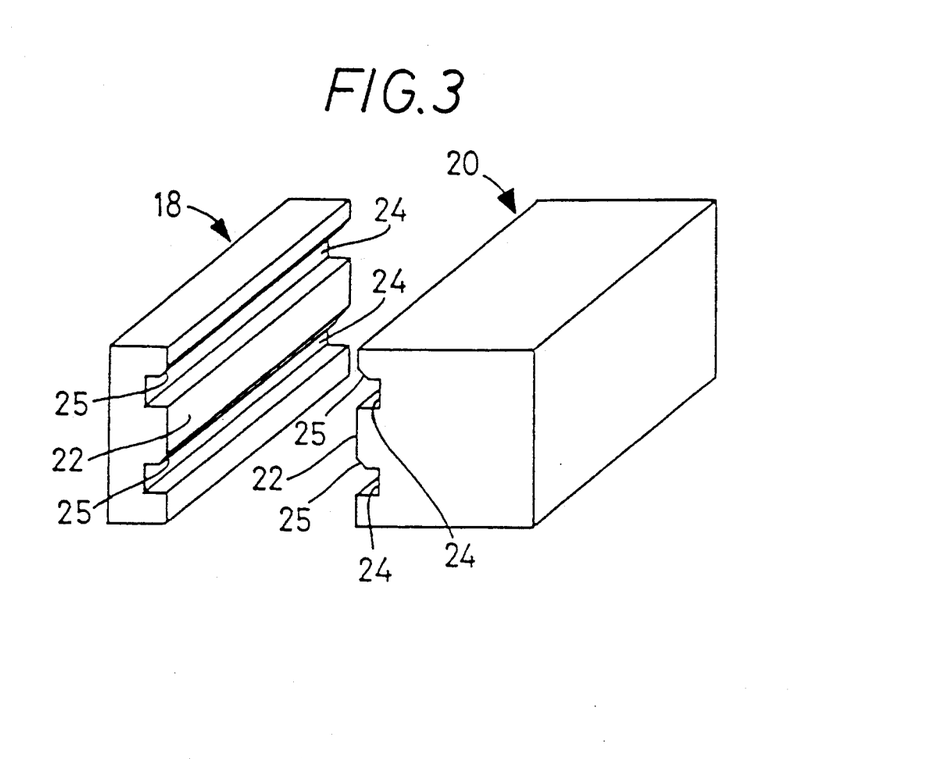
FIG. 3 is a perspective view illustrating the first and second ferrite blocks in which coil grooves are formed.

Further, at least one coil groove 24 is formed in the joining surface 22 of at least one of the two ferrite blocks 18, 20, so as to extend in the longitudinal direction of the blocks. In the present embodiment, two coil grooves 24 are formed in the joining surface 22 of each of the two ferrite blocks 18, 20, so that two ferrite bars 42 (FIG. 9) are prepared. A glass filler cutout 25 for accommodating a reinforcing glass filler 38 (FIG. 8) is formed along one of the opposite edges at the open end of each coil groove 24, which is adjacent to the magnetic gap to be formed.

Then, at least the parts of the joining surface 22 of at least one of the ferrite blocks 18, 20 which contribute to defining the magnetic gap are covered by a metallic magnetic material which has a higher saturation magnetic flux density than the ferrite material. This metallic magnetic material is applied to the surface or surfaces 22 by sputtering or other suitable method. The metallic magnetic material may be either a known crystalline alloy such as Fe-Si (Si content=6.5 wt. %), Fe-Al-Si alloy (Sendust) and Ni-Fe alloy (Permalloy), or a noncrystalline alloy such as Fe-Co-Si-B alloy and other known metal-metalloid alloys, and Co-Zr-Nb alloy and other known metal-metal alloys. Where Fe-Si or Fe- Si-Al alloy is used, no more than 5% by weight of an anti-corrosion element such as Cr, Ti and Ta is added to the alloy. While the magnetic material may be applied to the surface 22 by vacuum vapor deposition, ion-plating, CVD, plating or other techniques, the sputtering process is desirably used since the sputtering does not change the composition of the material, and since the sputtering is suitable for the alloy materials indicated above.

In the present embodiment, the selected metallic magnetic material is applied to cover the entire area of the joining surface 22 (including the areas defining the grooves 24 and cutouts 25) of only the first ferrite block 18. The applied material is indicated at 26 in FIG. 4.

Figure 4:
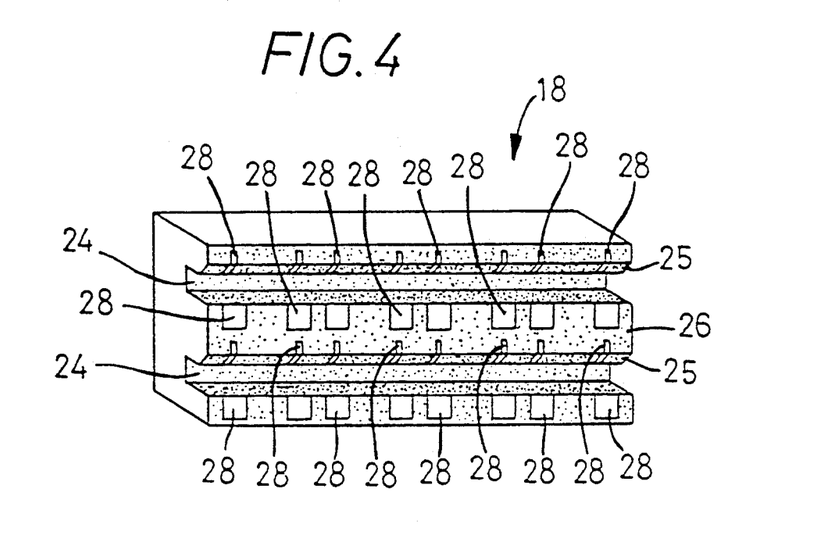
FIG. 4 is a perspective view illustrating a coating of a metallic magnetic material applied to the first ferrite block, and an etching mask formed on the coating.

As shown in FIG. 4, a patterned etching mask 28 is formed on the coating 26 of the metallic magnetic material on the first ferrite block 18, so that the selected areas of the magnetic coating 26 are left as metallic magnetic films 30, 32 (FIG. 5) having suitable dimensions.

The etching mask 28 covers at least the parts of the magnetic coating 26 which cooperate with the joining surface 22 of the second ferrite block 20 to define the magnetic gaps. Each portion of the mask 28 covering the above-indicated parts has a width equal to or larger than that of the track portions 13 but is smaller than that of the yoke portions 14. The mask 28 may also covers the parts of the coating 26 on the surfaces of the glass filler cutouts 25. The widths referred to above are all interpreted to mean a dimension as measured in the longitudinal direction of the ferrite block 18.

In the present embodiment, the etching mask 28 includes portions which cover the parts of the magnetic coating 26 on the first ferrite block 18 which partially define the rear or back gaps which are remote from the magnetic gaps along the annular magnetic path. These portions have a width equal to or smaller than that of the yoke portions 14, for example, 90% of the width of the yoke portions 14 (as measured in the direction perpendicular to the sliding direction or direction of extension of the air-bearing portions 10).

The etching mask 28 is formed by a suitable known method such as screen printing, which is selected in view of the required patterning accuracy and economy. For improved patterning accuracy and ease of processing, a method using a light-sensitive photoresist is preferably used. In this case, for instance, a photoresist is applied to the entire area of the metallic magnetic coating 26 on the joining surface 22 of the first ferrite block 18, and is locally selectively exposed to a radiation and subjected to a chemical etching, so that the exposed areas corresponding to the magnetic gaps and back gaps are left as the mask 28, with the non-exposed areas being removed by the chemical etching, so as to expose the magnetic coating 26. The photoresist may be a positive or a negative type. Where the vacuum vapor deposition, sputtering or CVD process is practiced, Cr or similar metals, or SiO or SiO2 may be used as the material for the mask 28. The material for the mask 28 is determined from the standpoint of the adhesion of the mask 28 to the magnetic coating 26, as well as the ease and economy of formation of the mask.

Figure 5:
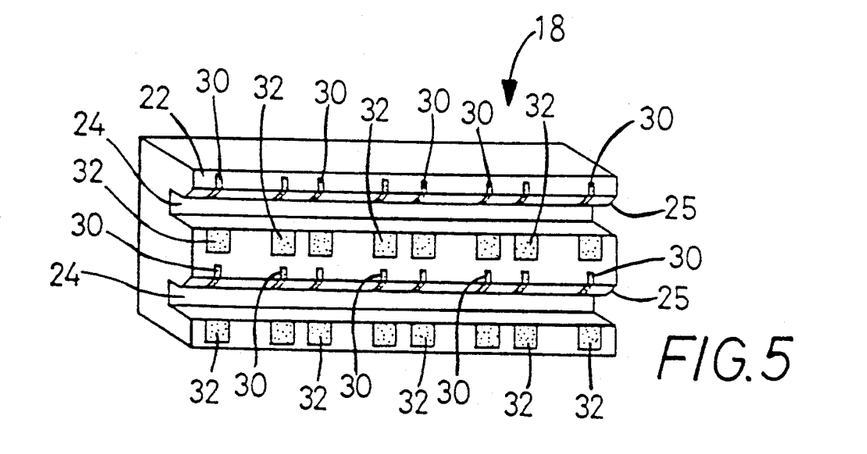
FIG. 5 is a perspective view illustrating a pattern of metallic magnetic films formed on the first ferrite block by etching the masked coating of FIG. 4.
Figure 6:
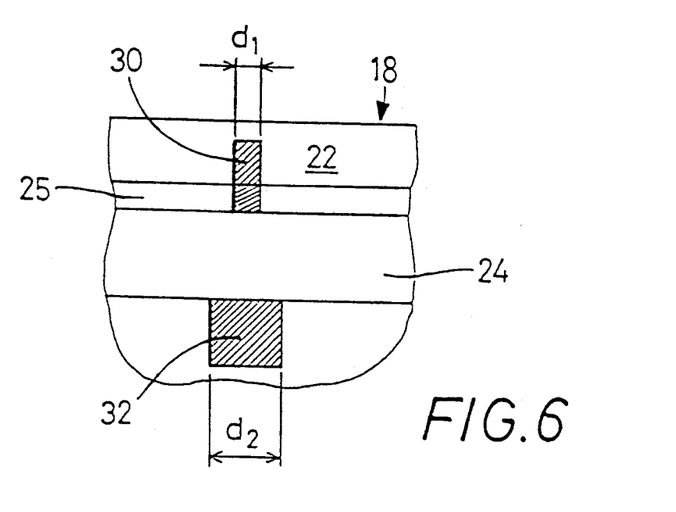
FIG. 6 is a fragmentary enlarged front elevational view showing a part of the first ferrite block in which the metallic magnetic films are formed.

The metallic magnetic coating 26 with the etching mask 28 thus formed thereon is then subjected to an etching operation, so that the areas of the coating 26 not covered by the mask 28 are removed. As a result, two arrays of first metallic magnetic films 30 are formed on the joining surface 22 of the first ferrite block 18, as shown in FIG. 5, for partially defining the magnetic gaps. These magnetic films 30 have a width d1 (FIG. 6) which is equal to or larger than, i.e., no less than that of the track portions 13, and which is equal to or smaller than, i.e., no more than a width d3 (FIG. 17) of the yoke portions 14 as measured in the longitudinal direction of the first ferrite block 18. Further, two arrays of second metallic magnetic films 32 are formed on the same joining surface 22, as also shown in FIG. 5, for partially defining the back gaps. The second magnetic films 32 have a width d2 which is no more than that of the yoke portions 14. The etching of the magnetic coating 26 may be effected by an ordinary electrolytic or chemical etching process.

The first and second metallic magnetic films 30, 32 thus formed on the first ferrite block 18 are then machined or ground as required to establish a desired thickness.

Figure 7:
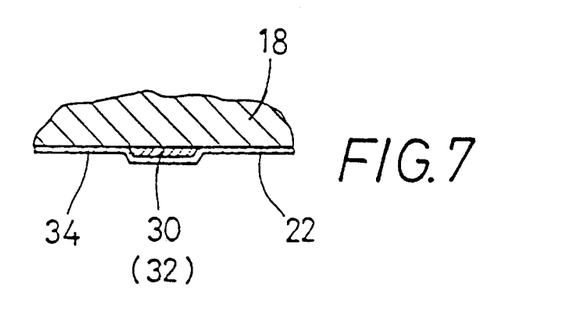
FIG. 7 is a fragmentary enlarged cross sectional view showing a non-magnetic layer formed on the first ferrite block.

In the next step, a non-magnetic material such as SiO2 or a glass is applied by sputtering to each first metallic magnetic film 30 on the first ferrite block 18 or to the area of the surface 22 of the second block 20 which cooperates with the corresponding magnetic film 30 to define the magnetic gap therebetween. Namely, a non-magnetic layer 34 having a suitable thickness is interposed between each magnetic film 30 and the opposite area of the second ferrite block 20, so that the non-magnetic layer 34 provides the magnetic gap. In the present embodiment, the non-magnetic layer 34 is formed over the entire area of the joining surface 22 of the first ferrite block 18, as indicated in FIG. 7, except for the areas defining the coil grooves 24, so that the arrays of the first and second magnetic films 30, 32 are both covered by the non-magnetic layer 34. However, the areas defining the coil grooves 24 may be covered by the non-magnetic layer 34.

Figure 8:
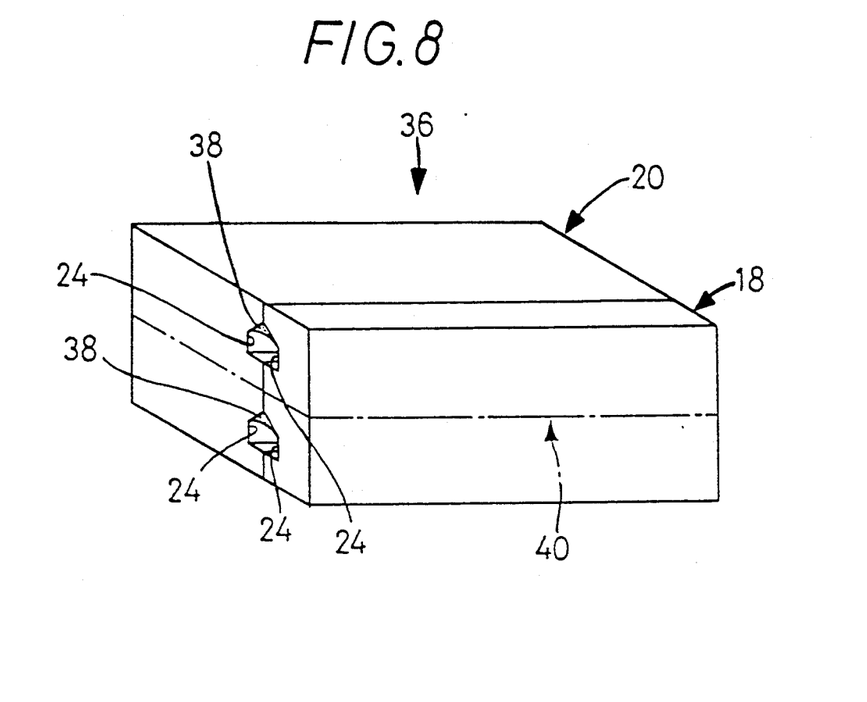
FIG. 8 is a perspective view showing an integral ferrite structure prepared by joining together the first and second ferrite blocks.
Figure 10:
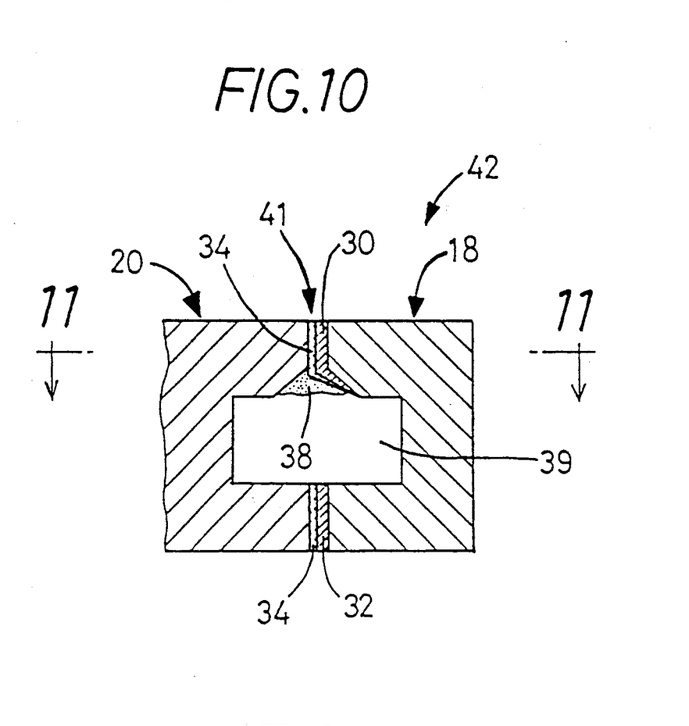
FIG. 10 is a fragmentary elevational view in cross section showing a head gap of the ferrite bar of FIG. 9.
Figure 11:
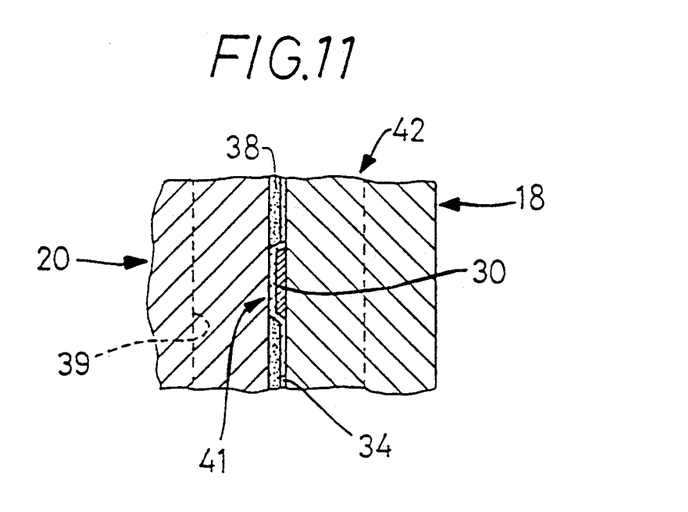
FIG. 11 is a fragmentary cross sectional view taken along line 11—11 of FIG. 10.

After the non-magnetic layer 34 is formed on the first ferrite block 18, the first and second ferrite blocks 18, 20 are butted together at the joining surfaces 22, 22 such that the coil grooves 24 of the two blocks 18, 20 are aligned with each other, as indicated in FIG. 8. In this condition, glass rods are inserted in cavities formed by the grooves 24, such that the glass rods are located adjacent to the glass filler cutouts 25. The butted blocks 18, 20 and the inserted glass rods are heated, with the blocks pressed against each other under a suitable pressure, so that the two blocks 18, 20 are joined or bonded together with molten glass masses of the glass rods. For example, the glass rods have a softening point of 450° C., and are heated to 500°-600° C. to join the two blocks 18, 20. Consequently, an integral ferrite structure 36 are obtained from the joined blocks 18, 20. In this ferrite structure 36, the non-magnetic layer 34 is interposed between the first magnetic films 30 of the first block 18 and the opposite areas of the second ferrite block 20, and a clearance between the other opposite areas of the joining surfaces 22 of the two blocks 18, 20 is filled with a reinforcing glass filler 38 derived from the heated glass rods, as also indicated in FIGS. 10 and 11, so that the two blocks 18, 20 are bonded together into the integral ferrite structure 36.

Figure 9:
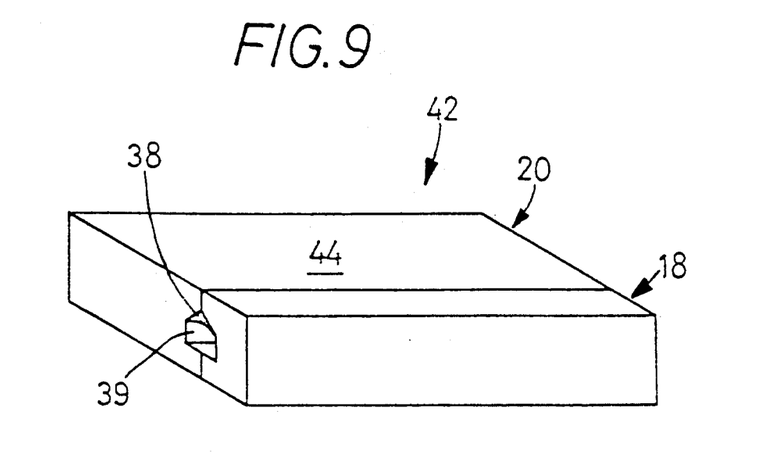
FIG. 9 is a perspective view showing a ferrite bar obtained by cutting the integral ferrite block of FIG. 8.

The thus prepared integral ferrite structure 36 is cut in a plane indicated at 40 in FIG. 8, to provide two ferrite bars 42 each having a coil aperture 39 as shown in FIG. 9.

A surface 44 of each ferrite bar 42 at which the ferrite structure 36 is cut is ground so that the magnetic gaps have a desired depth. The surface 44 provides the disk sliding or air-bearing surface 11 of each magnetic head core slider 16 of FIG. 1 obtained from the ferrite bar 42. As illustrated in FIGS. 10 and 11, the first metallic magnetic films 30 as well as the non-magnetic layer 34 are exposed on the ground surface 44, at the magnetic gap portions. The magnetic gap whose size (gap size) is determined by the thickness of the non-magnetic layer 34 is formed for each first magnetic film 30, as indicated at 41 in FIG. 10. Each magnetic gap 41 is open in the surface of the corresponding track portion 13 such that the magnetic gap 41 is parallel to the direction of width of the track portion 13.

Figure 12:
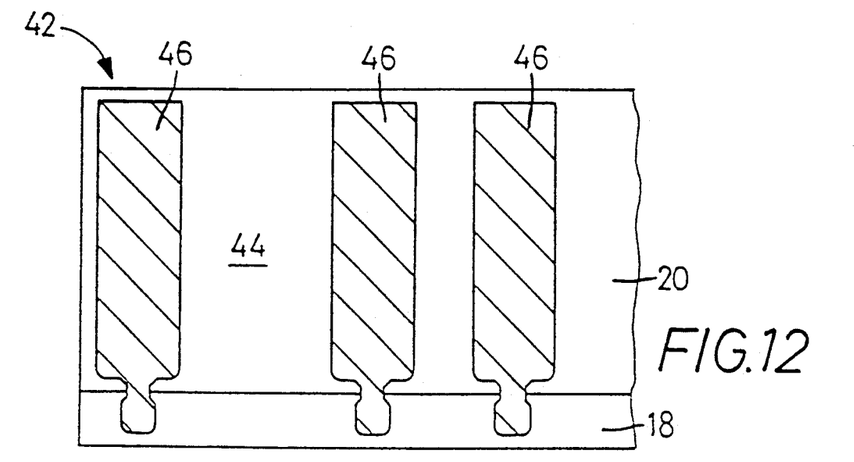
FIG. 12 is a fragmentary plan view showing an etching mask formed on the ferrite bar.

Then, the ground surface 44 of each ferrite bar 42 is provided with a patterned etching mask 46, as shown in FIG. 12, for forming the air-bearing portions 10, track portions 13 and protrusions 15 on the air-bearing surface 11 and the yoke portions 14. This etching mask 46 may be formed of a suitable material by a suitable known method, for example, by using a light-sensitive photoresist as used for the etching mask 28 for the magnetic films 30, 32. The material and method for forming the mask 46 are also selected in view of the ease of operation and economy.

Figure 13:
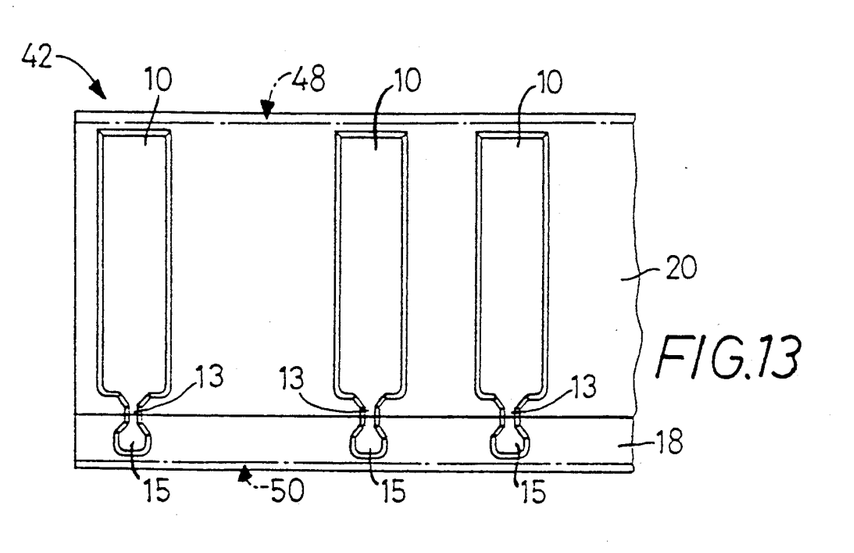
FIGS. 13 and 14 are a plan view and a fragmentary front elevational view showing the ferrite bar after an etching operation through the mask of FIG. 12.
Figure 14:
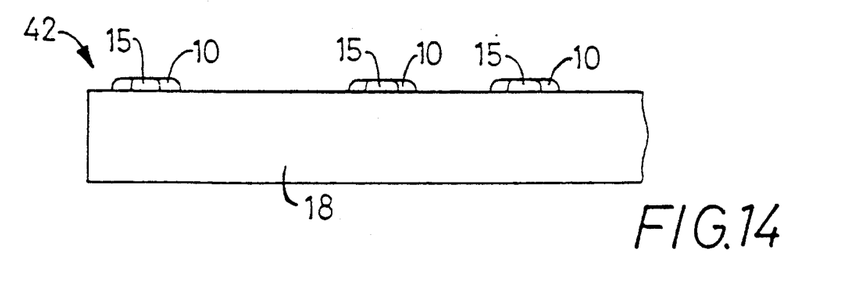

The ferrite bar 42 provided with the patterned etching mask 46 is then subjected to an etching operation to remove the stock by a suitable depth from the non-masked areas. As a result, raised portions corresponding to the pattern of the mask 46 are formed as shown in FIGS. 13 and 14. Namely, the ferrite bar 42 are provided with the air-bearing portions 10 having a predetermined width, the relatively narrow track portions 13, and the protrusions 15 whose width is larger than the track portions 13 and smaller than the air-bearing portions 10. These air-bearing and track portions 10, 13 and protrusions 15 have a height corresponding to the etching depth. This etching may also be effected by an electrolytic or chemical etching process.

Figure 15:
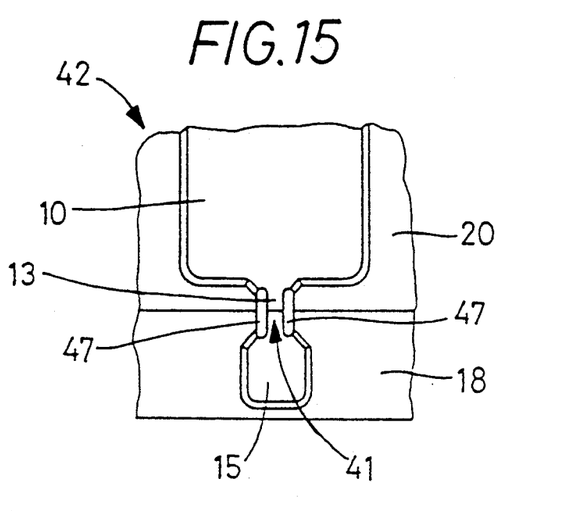
FIG. 15 is a fragmentary plan view indicating grooves formed by a laser-induced etching to define the width of a track portion of the ferrite bar.
Figure 16:
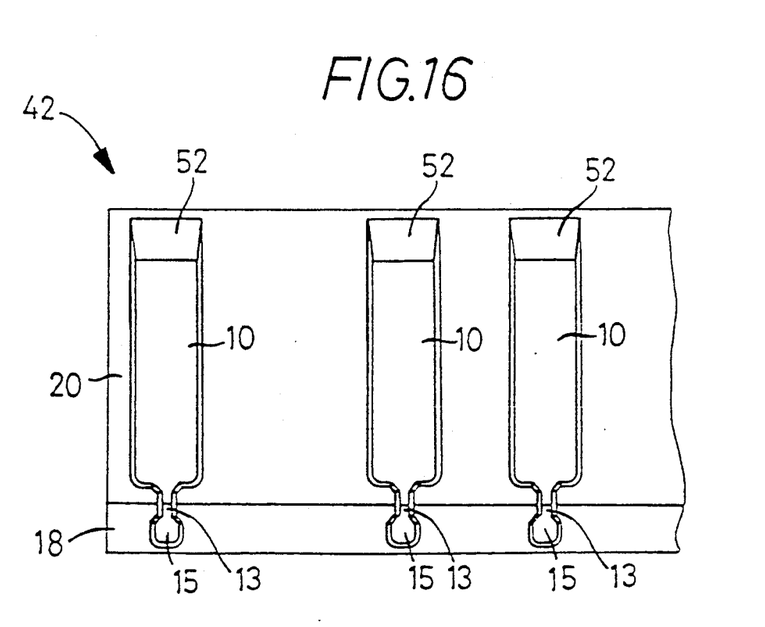
FIG. 16 is a fragmentary plan view showing chamfered surfaces formed on air bearing portions of the ferrite bar after the bar is cut to a desired width.

While the width of the track portions 13 may be controlled to a desired value by the etching operation, to determine the width of the magnetic gap 41, it is desirable to accurately control the width of the magnetic gap 41 by forming two spaced-apart parallel grooves 47, 47 along the opposite edges of each track portion 13. These grooves 47 may be formed by a laser beam or a laser-induced etching operation (irradiation of the relevant areas with a laser beam within a reaction fluid or gas), before or after the etching operation using the mask 46. The spacing between the two grooves 47 determines the width of the magnetic gap 41. The details of the laser-induced etching operation, which are not deemed essential to the understanding of the present invention, are provided in copending application Ser. No. 07/409,946 filed Sept. 20, 1989 (corresponding to unexamined Japanese Application No. 63-239244) now U.S. Pat. No. 4,948,460.

Figure 17:
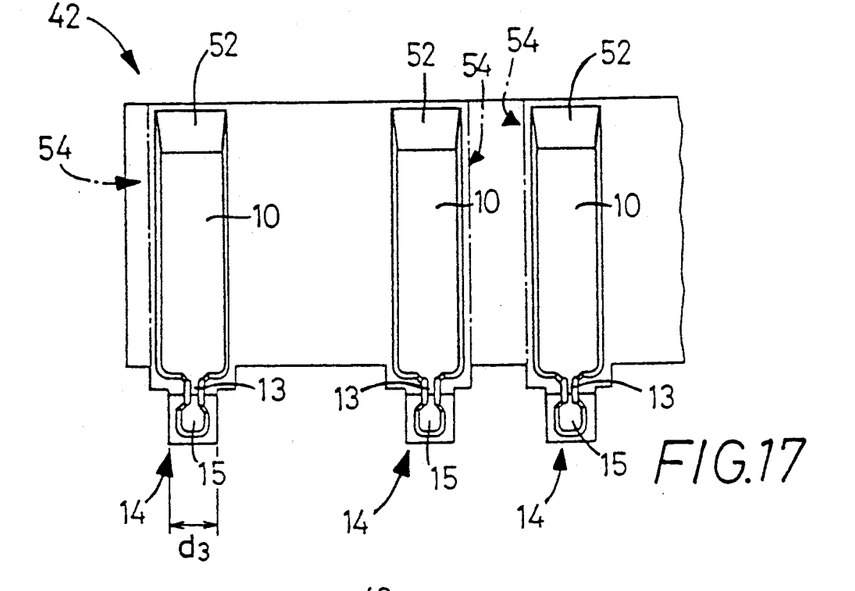
FIG. 17 is a fragmentary plan view showing yoke portions formed by cutting parts of the ferrite bar, and indicating cutting planes in which the bar is cut into magnetic head core sliders.

The ferrite bar 42 subjected to the etching operation using the mask 46 is then cut in two parallel cutting planes as indicated at 48, 50 in FIG. 13 by way of example, parallel to the longitudinal direction of the bar 42, so that the magnetic head core sliders 16 obtained from the bar 42 have a desired length corresponding to the width of the bar. Subsequently, the end portions of the air-bearing portions 10 are cut to provide respective chamfered portions or leading ramps 52, as shown in FIG. 17, so that the ramps 52 have suitable length and angle of inclination. Then, the portions around the track portions 13 and the protrusions 15 are removed by cutting the ferrite bar 42, whereby the generally C-shaped yoke portions 14 are formed or shaped as desired, as indicated in FIG. 17, such that the yoke portions 14 have the width d3 as measured in the direction of width of the magnetic gap 41, and such that the outer dimensions of the yoke portions 14 as viewed in FIG. 17 are larger than those of the track portions 13 and protrusions 15.

The ferrite bar 42 with the thus formed yoke portions 14 is cut into pieces, in cutting planes as indicated at 54 in FIG. 17, which are parallel to the direction of width of the bar 42, so that each piece has two pairs of air-bearing portions 10 (yoke portions 14). Namely, each piece provides the magnetic head core slider 16 shown in FIG. 1.

In the ferrite bar 42 wherein the width of the first metallic magnetic films 30 each partially defining the corresponding magnetic gap 41 at the track portion 13 is no more than that of the yoke portion 14, as described above, the first magnetic films 30 are not cut (or ground) when the yoke portion 14 is formed by cutting (or grinding) the bar 42. This arrangement effectively eliminates the otherwise possible separation or removal of the first magnetic films 30 from the ferrite material, and cracking of the ferrite material adjacent to the films 30, when the bar 42 is cut so as to define the width d3 of the yoke portions 14.

According to the present method described above, the composite magnetic head core slider 16 can be efficiently produced with a high yield ratio, so as to assure high operating stability and reliability of the core slider.

It is further noted that the width of the second metallic magnetic films 32 formed on the first ferrite block 18 to partially define the back gap of the core slider 16 is also smaller than the width d3 of the yoke portion 14, whereby the films 32 are protected from cutting and consequent removal from the back-gap defining portion of the bar 42 during the cutting of the bar 42 to form the yoke portion 14.

While the present invention has been described above in detail in one presently preferred form, it is to be understood that the invention is not limited to the details of the foregoing description of the illustrated embodiment.

Figure 18:
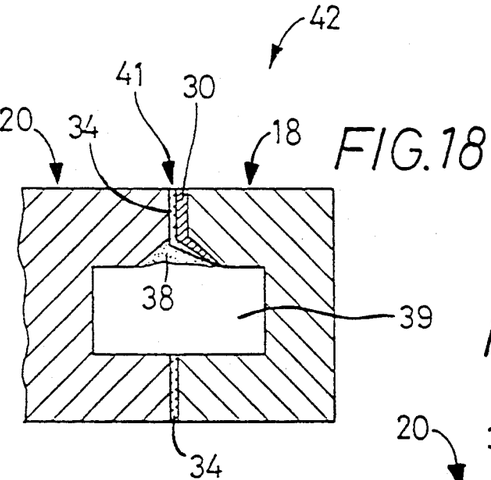
FIGS. 18 and 19 are views corresponding to that of FIG. 10, illustrating process steps in modified embodiments of the method of the present invention.

For example, the second metallic magnetic films 32 at the back gap of the core slider 16 are not essential, and may be eliminated as indicated in FIG. 18. In this case, the back-gap portions of the two ferrite blocks 18, 20 are bonded together by means of a suitable bonding layer such as the non-magnetic layer 34 interposed therebetween.

Figure 19:
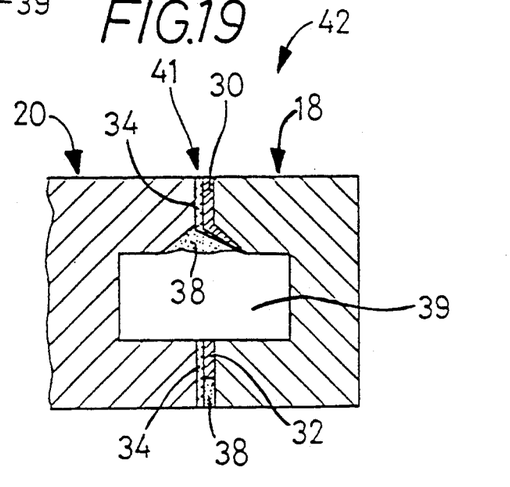

Another modification of the method is illustrated in FIG. 19, in which the second magnetic film 32 is provided to cover only an inner part of the back-gap portion of the surface 22 of the first ferrite block 18, and the reinforcing glass filler 38 interposed between the outer part of the back-gap portion and the corresponding portion of the surface 22 of the second ferrite block 20. This modified arrangement permits an increased bonding strength of the two ferrite blocks 18, 20 at the back gap.

It will be obvious to those skilled in the art that various other changes and modifications may occur in connection with the various process steps of the method. For example, the coil grooves 24 may be formed in the ferrite blocks 18, 20, after the patterned metallic magnetic films 30 are formed by etching the metallic magnetic coating 26 applied to at least the magnetic gap defining areas of the blocks 18, 20. As another example of modification, the patterned etching mask 28 is formed on the non-magnetic layer 34 formed on the metallic magnetic coating 26 provided on the magnetic gap defining areas of the blocks. In this case, a desired pattern of a lamination consisting of the metallic magnetic film 30 and the non-magnetic layer 34 is formed by etching through the mask 28. The etching operations of the metallic magnetic coating 26 and non-magnetic layer 34 may be performed continuously in an ion milling process, or one after the other in separate chemical etching steps using different etching solutions.

The magnetic head core slider 16 to which the illustrated embodiments (including those of FIGS. 18 and 19) are applied has two magnetic gaps (two track portions 13). It is to be understood that the principle of the invention is equally applicable to a magnetic head core slider which has a single magnetic gap or three or more magnetic gaps. It is needless to say that the invention is applicable to the manufacture of a core slider for a FDD head, a VTR head, a DAT head and other composite type magnetic heads, other than the RDD head.

It is also to be understood that the present invention may be embodied with various other changes, modifications and improvements, which may occur to those skilled in the art, without departing from the spirit and scope of the invention defined in the following claims.

What is claimed is:

1. A method of producing a composite type magnetic head core, including a step of joining together a first and a second ferrite block into an integral ferrite structure such that a metallic magnetic film is interposed between opposite portions of joining surfaces of the first and second ferrite blocks which define a magnetic gap open in an annular magnetic path which is partially defined by a track portion provided by the first and second ferrite blocks, and a step of cutting said integral ferrite structure to shape a yoke portion which includes at least a part of said track portion, said metallic magnetic film, said track portion and said yoke portion having a first, a second and a third width as measured in a direction parallel to said magnetic gap, respectively, said method comprising the step of:

before said first and second ferrite blocks are bonded together at said joining surfaces, forming said metallic magnetic film on at least one of said opposite portions of said joining surfaces of said first and second ferrite blocks, such that said first width is no less than said second width of said track portion, and is no more than said third width of said yoke portion.

2. A method according to claim 1, wherein said metallic magnetic film is formed on one of said opposite portions of said joining surfaces of said first and second blocks.

3. A method according to claim 1, wherein said step of forming said metallic magnetic film comprises applying a coating of a metallic magnetic material to at least a portion of at least one of said joining surfaces of said first and second ferrite blocks, which at least partially defines said magnetic gap, forming an etching mask so as to cover a part of said coating which corresponds to said metallic magnetic film, and subjecting said coating to an etching operation to remove the other part of said coating, whereby said metallic magnetic film is formed of said part of said coating which is covered by said etching mask.

4. A method according to claim 3, wherein said etching mask consists of a plurality of masking portions which respectively correspond to a plurality of magnetic gaps each open in a corresponding track portion provided by said first and second ferrite blocks.

5. A method according to claim 1, wherein said first width of said metallic magnetic film is about 90% of said third width of said yoke portion.

6. A method according to claim 1, further comprising a step of forming a non-magnetic layer adjacent to said metallic magnetic film.

7. A method according to claim 1, further comprising a step of interposing another metallic magnetic film between opposite portions of said joining surfaces of said first and second ferrite blocks which define a back gap at a position remote from said magnetic gap along said annular magnetic path, a width of said another metallic magnetic film being no more than said third width of said yoke portion.

8. A method according to claim 7, further comprising a step of forming a non-magnetic layer adjacent to said another metallic magnetic film.

9. A method according to claim 1, further comprising a step of interposing a non-magnetic layer between opposite portions of said joining surfaces of said first and second ferrite blocks which define a back gap at a position remote from said magnetic gap along said annular magnetic path.

10. A method according to claim 1, wherein said metallic magnetic film is formed of a metallic magnetic material selected from the group consisting of crystalline alloys and non-crystalline alloys.

11. A method according to claim 1, wherein said metallic magnetic material is formed by sputtering.

* * * * *